(12) United States Patent
Lin

(10) Patent No.: US 12,113,419 B2
(45) Date of Patent: Oct. 8, 2024

(54) COUNTERWEIGHTED VIBRATION DEVICE AND MANUFACTURING METHOD THEREOF

(71) Applicant: Ming-Hung Lin, Guangdong (TW)

(72) Inventor: Ming-Hung Lin, Guangdong (TW)

( * ) Notice: Subject to any disclaimer, the term of this patent is extended or adjusted under 35 U.S.C. 154(b) by 335 days.

(21) Appl. No.: 17/870,019

(22) Filed: Jul. 21, 2022

(65) Prior Publication Data

US 2024/0030796 A1    Jan. 25, 2024

(51) Int. Cl.
*H02K 33/18*    (2006.01)
*B06B 1/04*    (2006.01)
*H02K 5/22*    (2006.01)
*H02K 33/02*    (2006.01)

(52) U.S. Cl.
CPC ............ *H02K 33/18* (2013.01); *B06B 1/045* (2013.01); *H02K 5/225* (2013.01); *H02K 33/02* (2013.01); *H02K 2211/03* (2013.01)

(58) Field of Classification Search
CPC .......... H02K 33/18; H02K 7/34; H02K 33/02; H02K 33/16; H02K 35/00
USPC ....................................... 310/15, 36, 51, 81
See application file for complete search history.

(56) References Cited

U.S. PATENT DOCUMENTS

| 2014/0054983 A1* | 2/2014 | Moon | H02K 33/16 310/28 |
| 2014/0062224 A1* | 3/2014 | Kim | H02K 33/16 310/15 |
| 2020/0076287 A1* | 3/2020 | Takahashi | H02K 33/06 |

* cited by examiner

*Primary Examiner* — Jose A Gonzalez Quinones

(57) ABSTRACT

The present invention discloses a counterweighted vibration device and a manufacturing method thereof. The counterweighted vibration device includes a shell provided with a hollow cavity and a vibration assembly, wherein the shell is provided with two elastic support structures located at two ends of the vibration assembly, and the shell is further provided with slots configured for passage of the two ends of the vibration assembly and to be in communication with the hollow cavity; the vibration assembly includes two counterweights each located at one of the two ends thereof, short strong magnetic strips each adjacent to one of the counterweights, a long strong magnetic strip located between the two short strong magnetic strips, and two fixing screws located on two sides separately and configured to couple the counterweights, the short strong magnetic strips and the long strong magnetic strip together; the vibration device further includes two coils, and a change in a current flowing through each of the two coils causes a magnetic force to change, so as to produce vibration of the vibration assembly in proportion to the change in the current; and the counterweights are of a non-magnetic material. In the present invention, a magnetic field generated by the short strong magnetic strips and the long strong magnetic strip is limited to a smaller range, so that the movement range of the magnetic field of the vibration assembly during vibration is reduced, thereby reducing the influence on the coils and providing a better vibration effect.

10 Claims, 5 Drawing Sheets ial noise.
COUNTERWEIGHTED VIBRATION DEVICE AND MANUFACTURING METHOD THEREOF

TECHNICAL FIELD

The present invention relates to a vibration device, in particular to a counterweighted vibration device and a manufacturing method thereof.

BACKGROUND

Vibration devices in the market can be divided into three categories. The first category uses a motor to drive a rotor to rotate; the vibration frequency is directly related to the speed of the motor and the vibration frequency is difficult to control, so that it is difficult to achieve an effect of accurate vibration frequency. Moreover, there is mechanical vibration noise, which cannot synchronize with an audio. The second category uses a moving-coil to drive a vibrating plate to achieve a vibration effect, but the low power of vibration cannot meet product requirements and cannot drive the products with a large weight. The third category uses electromagnetic drive to achieve the vibration effect by elastic sheet suppression, but it still cannot reduce the mechanical noise.

Therefore, it is necessary to develop a vibration device which can synchronize with an audio and has low mechanical noise.

In addition, in the process of driving a vibration assembly by means of coils, a magnetic force of the vibration assembly will reciprocate with the vibration assembly, and when reaching its end limit position for switching, the magnetic force will have a restraining effect on the coils. Therefore, it is necessary to develop a vibration device and a manufacturing method thereof, which can reduce the influence on the coils.

SUMMARY

Aiming at the above problems existing in the prior art, the present invention provides a counterweighted vibration device and a manufacturing method thereof.

The purpose of the present invention is realized by the following technical schemes:

A counterweighted vibration device of the present invention includes a shell provided with a hollow cavity and a vibration assembly arranged in the hollow cavity, wherein the shell is provided with two elastic support structures located at two ends of the vibration assembly; the shell is further provided with slots configured for passage of the two ends of the vibration assembly and to be in communication with the hollow cavity; the vibration assembly includes two counterweights each located at one of the two ends thereof, short strong magnetic strips each adjacent to one of the counterweights, a long strong magnetic strip located between the two short strong magnetic strips, and two fixing screws located on two sides separately and configured to couple the counterweights, the short strong magnetic strips and the long strong magnetic strip together; the vibration device further includes two coils fixed to an inner wall of the hollow cavity and located on an outer periphery of the short strong magnetic strips and the long strong magnetic strip, and a change in a current flowing through each of the two coils causes a magnetic force to change, so as to produce vibration of the vibration assembly in proportion to the change in the current; and the counterweights are of a non-magnetic material.

Optionally, an outer end of one of the counterweights has one side as an outer coupling side, which extends to an outer side of one of the slots and is fixedly coupled to one of the elastic support structures, and another side as an inner coupling side, which is provided with a screw hole configured for passage of one of the fixing screws; and an outer end of the other one of the counterweights has one side as an inner coupling side, which is provided with a screw hole configured for passage of the other one of the fixing screws, and another side as an outer coupling side, which extends to an outer side of the other one of the slots and is fixedly coupled to the other one of the elastic support structures.

Optionally, each of the elastic support structures is an, elastic sheet having one end fixedly coupled to the shell and the other end fixedly coupled to the outer coupling side of one of the counterweights; and the outer side of each of the slots is provided with a clearance recess configured to make space for the elastic sheet.

Optionally, each of the outer coupling sides has a thickness greater than or equal to twice that of a respective inner coupling side.

Optionally, a hollow is provided in the middle of each of the counterweights, and, is sized according to counterweighting parameters.

Optionally, the elastic sheet is provided centrally with an oval slot; and the end of the elastic sheet fixedly coupled to the shell is provided with two screw holes.

Optionally, lateral sides of the short strong magnetic strips and the long strong magnetic strip are provided with opening grooves configured for passage of the fixing screws; and each of the counterweights is provided with a protrusion configured to mate with the oval slot for alignment during coupling.

Optionally, the shell is of a cuboid structure; the hollow cavity is provided with an upper opening for the coils to be installed into the hollow cavity; a side edge of the upper opening is provided with notches for passage of wires of the coils; an installation side recess for embedded installation of a printed circuit board (PCB) is provided at an outer side of the notches; and an outer side of the PCB is provided with electrical contacts to connect the wires.

A manufacturing method of the counterweighted vibration device of the present invention includes the following assembly steps: first, fixedly coupling one of the counterweights, one of the short strong magnetic strips, the long strong magnetic strip, the other one of the short strong magnetic strips and the other one of the counterweights together at two sides by using the two fixing screws, so as to form the vibration assembly; embedding coils into a hollow cavity from an upper opening of a shell; then passing the vibration assembly into the coils from the outer side of one of the slots; and then fixedly coupling each of the elastic sheets to the shell via two fixing screws with aid of the protrusion for alignment, and fixedly coupling each elastic sheet to the outer coupling side of one of the counterweights via one screw.

More specifically, the assembly steps adopt an automatic assembly mode using an automatic conveying guide rail, with the upper opening of the shell placed upward and the steps starting from a feeding station, wherein at a first station, which is the feeding station, the shell is placed within a jig provided at the first station;

at a second station, the coils are put into the hollow cavity through the upper opening;

at a third station, the vibration assembly is passed by a pushing mechanism into the coils in the hollow cavity from the outer side of one of the slots;

at a fourth station, the two elastic sheets are fixedly coupled to the shell and the outer coupling sides of the counterweights, respectively, by using screw mechanisms;

at a fifth station, surface stickers and a printed circuit board (PCB) are attached; and at a sixth station, which is a discharge station, the assembled product is removed from the jig, wherein the jig is installed in a reciprocating slide rail, from the feeding station through to the discharge station; and a vertical belt conveyor guide rail or a horizontal belt conveyor guide rail is used.

Generally speaking, compared with the prior art, the present invention has the following beneficial effects. The vibration assembly of the present invention uses non-magnetic counterweights at two ends thereof, so that a magnetic field generated by the short strong magnetic strips and the long strong magnetic strip is limited to a smaller range, and the movement, range of the magnetic field, of the vibration assembly during vibration is reduced, thereby reducing the influence on the coils and providing a better vibration effect. Further, the counterweights adopt a structure in which the thickness of the outer coupling side is greater than that of the inner coupling side, so that a beveled structure can be formed and the inner coupling side can be prevented from hitting the elastic sheet. Furthermore, the hollow is used to adjust the mass of the counterweights by changing the size of the hollow, so as to achieve different counterweighting effects. With the clearance recess arranged inward, the shape of the device remains as a complete cuboid structure, which is compact overall and aesthetically pleasing and has a high strength. The upper opening facilitates installation of the coils; and the installation side recess facilitates embedding of the PCB into the cuboid structure, thereby maintaining a cuboid shape, providing an appealing appearance, and also facilitating automatic assembly. The assembly method of the vibration device of the present invention is suitable for adopting automatic equipment to realize automatic assembly. The vibration device of the present invention can be widely used in small Bluetooth speakers, electric sports gamepads, electric sports headphones, massage devices, electric toys and other products.

Figure 1:
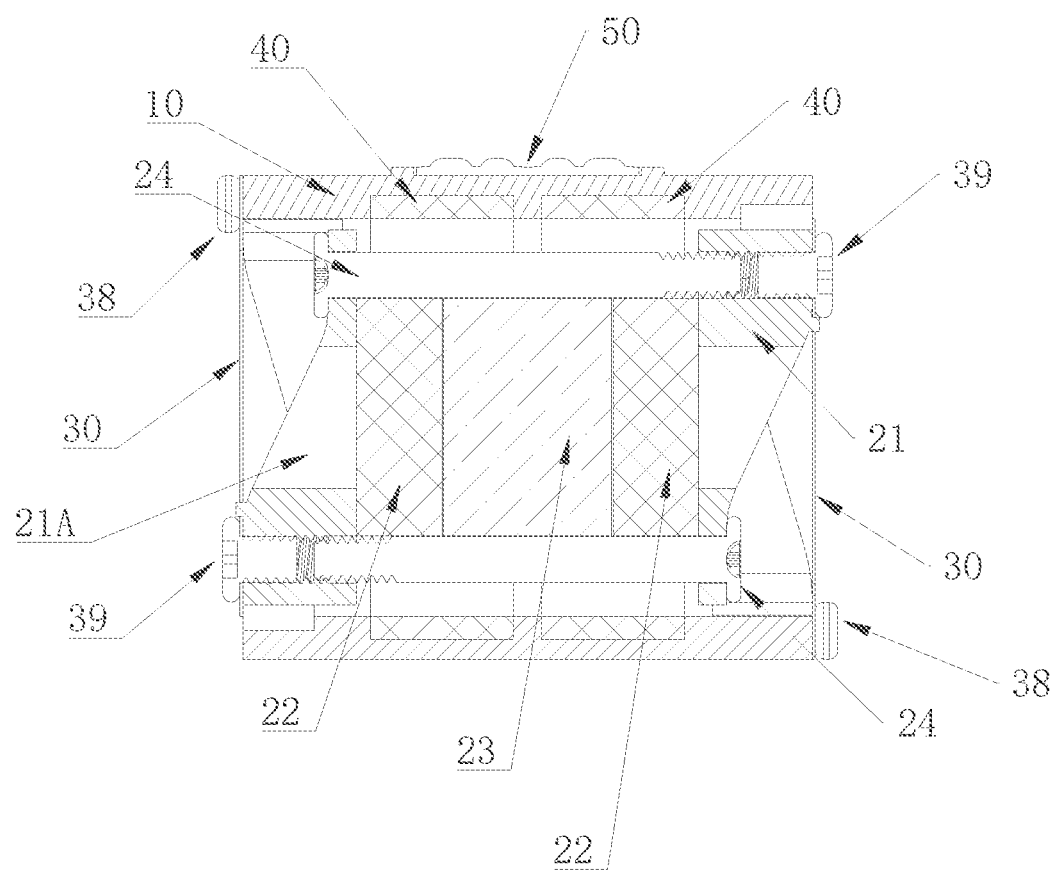
FIG. 1 is a sectional view of a vibration device according to a specific embodiment of the present invention.

List of reference numerals:

| 10  | Shell                    | 100 | Hollow cavity      |
| 101 | Slot                     | 102 | Clearance recess   |
| 107 | Installation side recess | 108 | Notch              |
| 109 | Upper opening            | 20  | Vibration assembly |
| 21  | Counterweight            | 21A | Counterweight      |

-continued

List of reference numerals:

| 210 | Hollow              | 211 | Outer coupling side        |
| 212 | Inner coupling side | 213 | Screw hole                 |
| 217 | Protrusion          | 22  | Short strong magnetic strip|
| 221 | Opening groove      | 23  | Long strong magnetic strip |
| 231 | Opening groove      | 24  | Fixing screw               |
| 30  | Elastic sheet       | 301 | Oval slot                  |
| 302 | Screw hole          | 40  | Coil                       |
| 50  | PCB.                |     |                            |

DETAILED DESCRIPTION

In order to fully understand the technical content of the present invention, the technical scheme of the present invention is further introduced and explained in connection with specific embodiments, but is not limited thereto.

Figure 2:
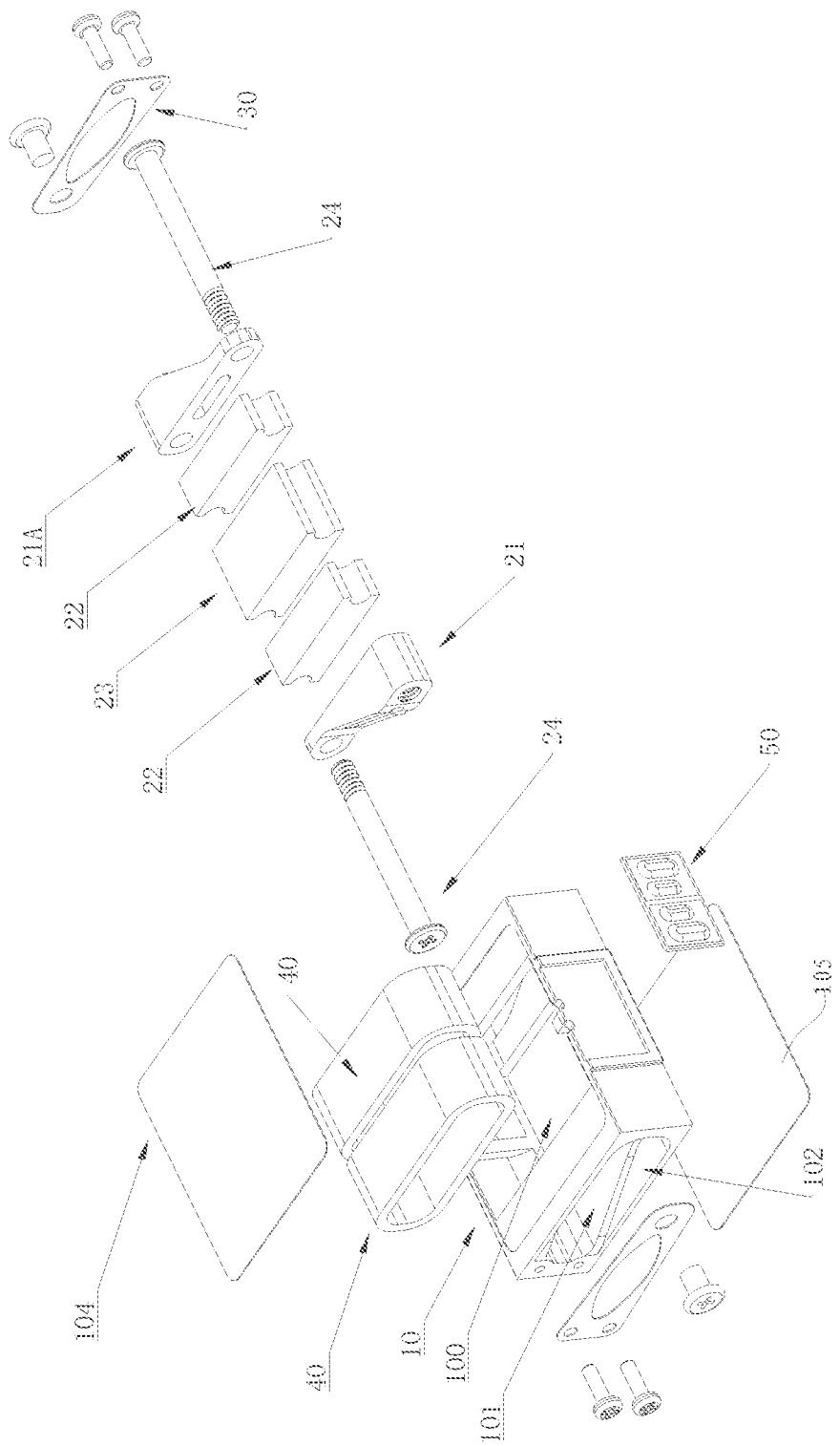
FIG. 2 is an exploded perspective view of the embodiment of FIG.
Figure 3:
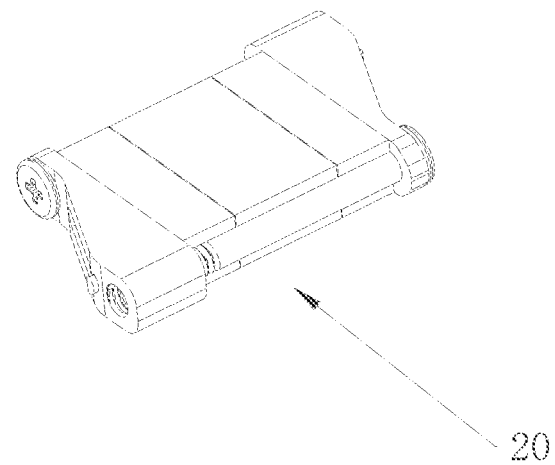
FIG. 3 is a perspective view of a vibration assembly part of the embodiment of FIG. 1.
Figure 4:
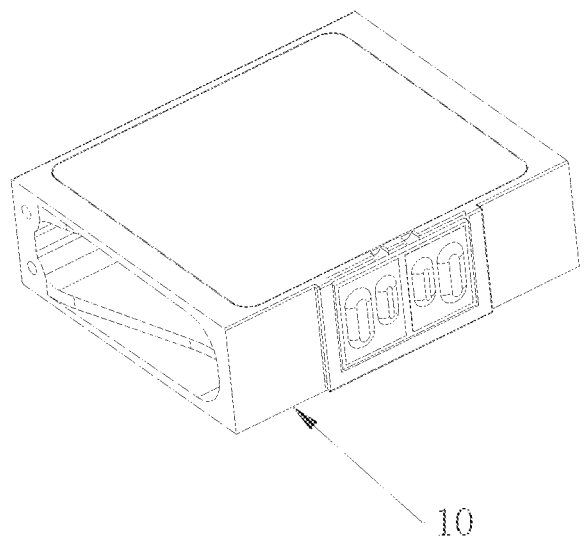
FIG. 4 is an exploded view of FIG. 3.
Figure 5:
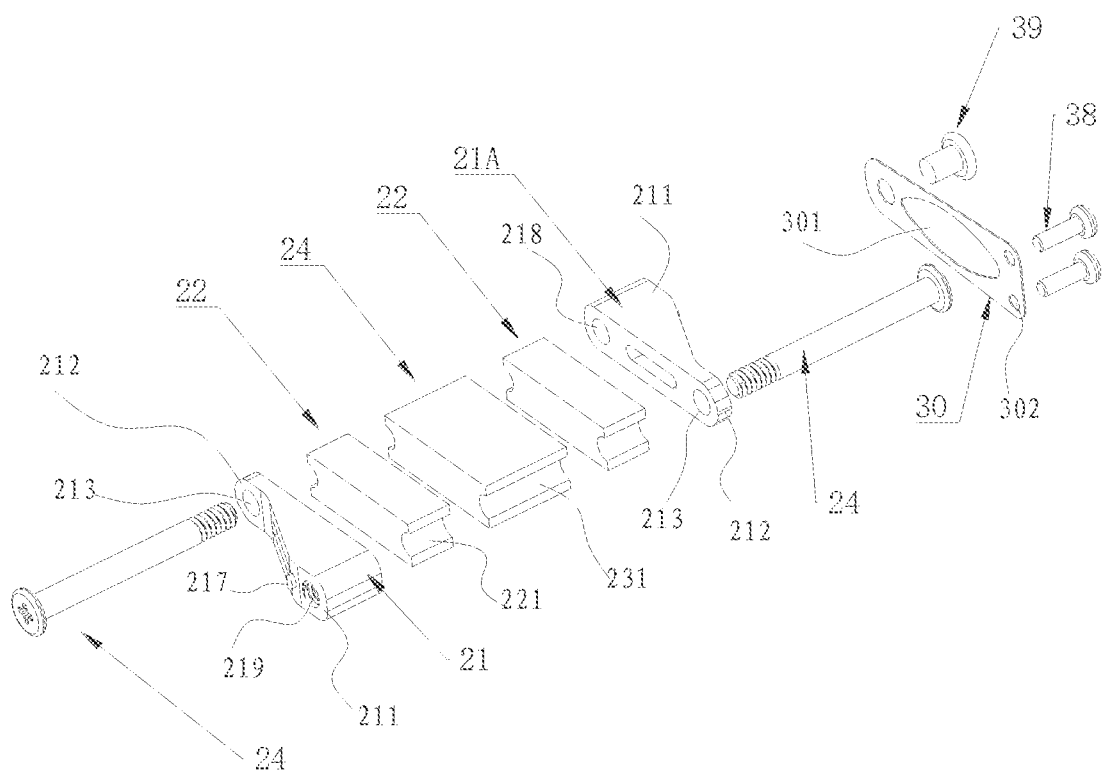
FIG. 5 is a perspective view of a shell of the embodiment of FIG. 1.
Figure 6:
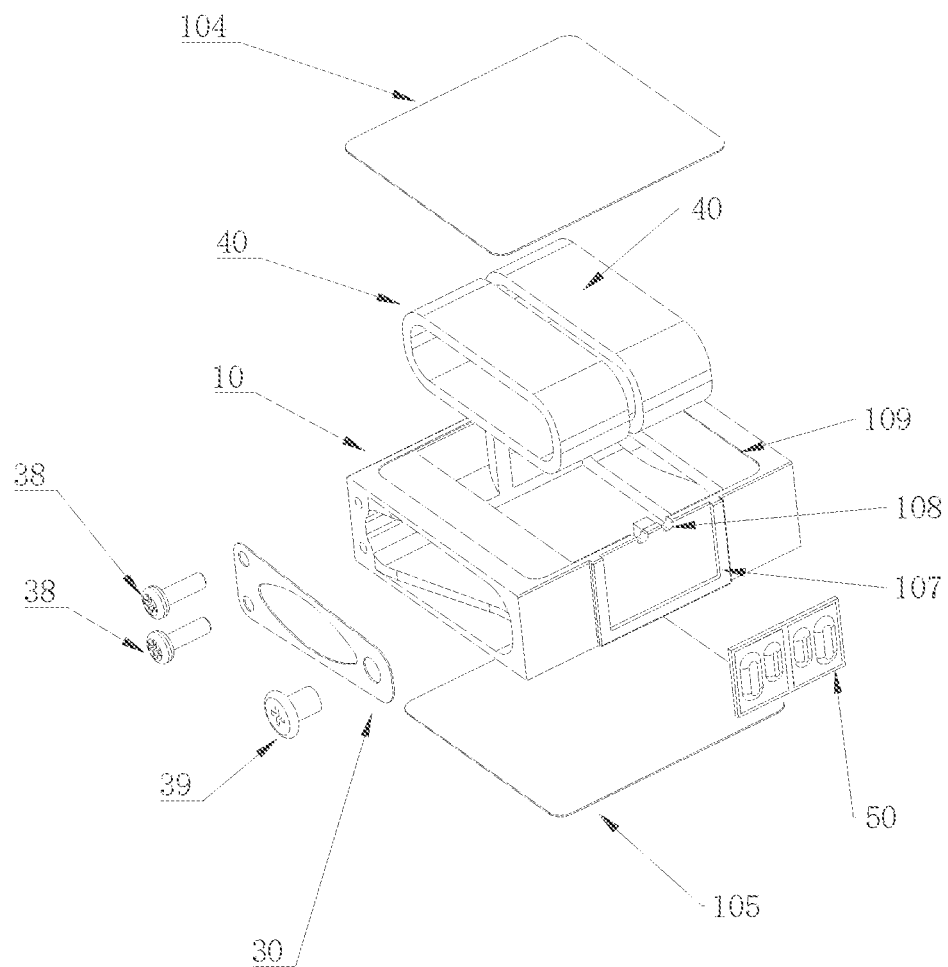
FIG. 6 is an exploded view of FIG. 5.

According to the embodiment shown in FIGS. 1-6, a counterweighted vibration device includes a shell 10 with a hollow cavity 100 and a vibration assembly 20 arranged in the hollow cavity 100. The shell is 10 provided with two elastic support structures located at two ends of the vibration assembly 20. The shell 10 is further provided with slots 101 configured for passage of the two ends of the vibration assembly 20 and to be in communication with the hollow cavity 100. The vibration assembly 20 includes two counterweights 21 separately located at its two ends, short strong magnetic strips 22 each adjacent to one of the counterweights 21, a long strong magnetic strip 23 located between the two short strong magnetic strips 22, and two fixing screws 24 located on two sides separately and configured to couple the counterweights 21, the short strong magnetic strips 22 and the long strong magnetic strip 23 together. The vibration device further includes two coils 40 fixed to an inner wall of the hollow cavity 100 and located on an outer periphery of the short strong magnetic strips 22 and the long strong magnetic strip 23, and a change in a current flowing through each of the two coils 40 causes a magnetic force to change, so as to produce vibration of the vibration assembly 20 in proportion to the change in the current. The counterweights 21 are of a non-magnetic material and are used to isolate the edge magnetic poles of the short strong magnetic strips. When the vibration assembly operates to a maximum amplitude, the reverse action power that counteracts the forward action power will not be generated between the vibration assembly and the coils, so that the operation efficiency can be improved.

More specifically, an outer end of one of the counterweights 21 has one side as an outer coupling side 211, an outer end of which is provided with a screw hole 219, which extends to the outside of a respective slot 101 and is fixedly coupled to a respective elastic support structure (i.e., elastic sheet 30) via a screw 39, and another side as an inner coupling side 212, which is provided with a screw hole 213 configured for passage of a respective fixing screw 24; and an outer end of the other one of the counterweights 21A has one side as an inner coupling side 212, which is provided with a screw hole 213 configured for passage of a respective fixing screw 24, and another side as an outer coupling side 211, which extends to an outer side of a respective slot 101 and is fixedly coupled to a respective elastic support structure. The inner ends of the outer coupling sides of the two counterweights are each further provided with a threaded hole 218 coupled with one of the fixing screws 24. The threaded hole 218 and the screw hole 219 may be screw holes of the same axis (the same thread may be used) or may be threaded holes of different axes.

More specifically, each of the elastic support structures is an elastic sheet 30. The elastic sheet 30 has one end fixedly coupled to the shell 10 via screws 38, and the other end fixedly coupled to the outer coupling side 211 of one of the counterweights 21, 21A. A clearance recess 102 configured to make space for the elastic sheet 30 is provided on the outer side of a respective slot 101.

More, specifically, each of the outer coupling sides 211 has a thickness greater than or equal to twice that of a respective inner coupling side 212. In this way, an outer bevel can be formed to prevent the inner coupling side from hitting the elastic sheet during vibration.

More specifically, a hollow 210 is provided in the middle of each of the counterweights 21, and the hollow 210 is sized according to counterweighting parameters.

More specifically, the elastic sheet 30 is provided centrally with an oval slot 301; and the end of the elastic sheet 30 fixedly coupled to the shell 10 is provided with two screw holes 302.

More specifically, lateral sides of the short strong magnetic strips 22 and the long strong magnetic strip 23 are provided with opening grooves 221, 231 configured for passage of the fixing screws 24; and each of the counterweights 21 is provided with a protrusion 217 matching a respective oval slot 301 and configured for alignment during coupling.

More, specifically, the shell is of a cuboid structure; the hollow cavity 100 is provided with an upper opening 109 for the coils 40 to be installed into the hollow cavity 100; a side edge of the upper opening 109 is provided with notches 108 for passage of wires of the coils 40; an installation side recess 107 for embedded installation of a PCB 50 is provided at an outer side of the notches 108; and an outer side of the PCB 50 is provided with electrical contacts to connect the wires.

More specifically, a top sticker 104 is provided over the upper opening 109, and a bottom sticker 105 is provided under the shell 10.

More specifically, the oval slot 301 in each elastic sheet is provided with two symmetrical circular arc-shaped cuts, and the outer edges of the elastic sheet are straight lines, so that it is convenient to adjust the deformation degree of the elastic sheet and control the deformation curvature of the elastic sheet to achieve the best elastic effect.

When the vibration assembly is installed, the counterweights 21, the short strong magnetic strips 22 and the long strong magnetic strip 23 are tightly coupled together via the fixing screws. Adjacent surfaces of the short strong magnetic strips 22 and the long strong magnetic strip 23 are of the same magnetic polarity. After being fastened by the fixing screws, the two short strong magnetic strips can extend the magnetic field of the middle, long strong magnetic strip 23 in a radial direction, thereby interacting with the magnetic field of the coils, reducing, the overflow of the magnetic field and forming a better vibration effect.

The shell preferentially has a flat profile, that is, the height is small, far less than its length and width. Moreover, the short strong magnetic strips and the long strong magnetic strip are also of a flat strip structure.

In an alternative embodiment, each elastic support structure may also include a reinforcing sheet coupled to fixing ends of the elastic sheet and the shell to increase the support strength.

In an alternative embodiment, the lateral sides of the short strong magnetic strips 22 and the long strong magnetic strips 23 may alternatively be provided with through-holes configured for passage of the fixing screws for fixed coupling.

A manufacturing method of the counterweighted vibration device of the present invention includes the following assembly steps: first, fixedly coupling one of the counterweights, one of the short strong magnetic strips, the long strong magnetic strip, the other one of the short strong, magnetic strips and the other one of the counterweights together at two sides by using the two fixing screws, so as to form the vibration assembly; embedding coils into a hollow cavity from an upper opening of a shell; then passing the vibration assembly into the coils from the outer side of one of the slots; and then fixedly coupling each of the elastic sheets to the shell via two fixing screws with aid of the protrusion for alignment, and fixedly coupling each elastic sheet to the outer coupling side of one of the counterweights via one screw.

More specifically, the assembly steps adopt an automatic assembly mode using an automatic conveying guide rail, with the upper opening of the shell placed upward and the steps starting from a feeding station, wherein at a first station, which is the feeding station, the shell is placed within a jig provided at the first station;

at a second station, the coils are put into the hollow cavity through the upper opening;

at a third station, the vibration assembly is passed by a pushing mechanism, into the coils in the hollow cavity from the outer side of one of the slots;

at a fourth station, the two elastic sheets are fixedly coupled to the shell and the outer coupling sides of the counterweights, respectively, by using screw mechanisms;

at a fifth station, surface stickers and a printed circuit board (PCB) are attached; and at a sixth station, which is a discharge station, the assembled product is removed from the jig, wherein the jig is installed in a reciprocating slide rail moving from the feeding station to the discharge station; and a vertical belt conveyor guide rail or a horizontal belt conveyor guide rail is used.

In summary, compared with the prior art, the present invention has the following beneficial effects. The vibration assembly of the present invention uses non-magnetic counterweights at two ends thereof, so that a magnetic field generated by the short strong magnetic strips and the long strong magnetic strip is limited to a smaller range, and the movement range of the magnetic field of the vibration assembly during vibration is reduced, thereby reducing the influence on the coils and providing a better vibration effect. Further, the counterweights adopt a structure in which the thickness of the outer coupling side is greater than that of the inner coupling side, so that a beveled structure can be formed and the inner coupling side can be prevented from hitting the elastic sheet. Furthermore, the hollow is used, so as to adjust the mass of the counterweight by changing the size of the hollow, so as to achieve different counterweighting effects. With the clearance recess arranged inward, the shape of the device remains as a complete cuboid structure, which is compact overall and aesthetically pleasing and has a high strength. The upper opening, facilitates installation of the coils; and the installation side recess facilitates embedding of the PCB into the cuboid structure, thereby maintaining a cuboid shape, providing an appealing appearance, and also facilitating automatic assembly. The assembly method of the vibration device of the present invention is suitable for adopting automatic equipment to realize automatic assembly. The vibration device of the present invention can be widely used in small Bluetooth speakers, electric sports gamepads, electric sports headphones, massage devices, electric toys and other products.

The above embodiments are used merely to further explain the technical content of the present invention, so that readers can understand the present invention more easily, and it is not intended that the embodiments of the present invention are limited thereto, and any technical extension or re-creation according to the present invention is protected by the present invention. The scope of protection of the present invention is subject to the appended claims.

The invention claimed is:

1. A counterweighted vibration device, comprising a shell provided with a hollow cavity and a vibration assembly arranged in the hollow cavity, wherein the shell is provided with two elastic support structures located at two ends of the vibration assembly; the shell is further provided with slots configured for passage of the two ends of the vibration assembly and to be in communication with the hollow cavity; the vibration assembly comprises two counterweights each located at one of the two ends thereof, short strong magnetic strips each adjacent to one of the counterweights, a long strong magnetic strip located between the two short strong magnetic strips, and two fixing screws located on two sides separately and configured to couple the counterweights, the short strong magnetic strips and the long strong magnetic strip together; the vibration device further comprises two coils fixed to an inner wall of the hollow cavity and located on an outer periphery of the short strong magnetic strips and the long strong magnetic strip, and a change in a current flowing through each of the two coils causes a magnetic force to change, so as to produce vibration of the vibration assembly in proportion to the change in the current; and the counterweights are of a non-magnetic material.

2. The counterweighted vibration device of claim 1, wherein an outer end of one of the counterweights has one side as an outer coupling side, which extends to an outer side of one of the slots and is fixedly coupled to one of the elastic support structures, and another side as an inner coupling side, which is provided with a screw hole configured for passage of one of the fixing screws; and an outer end of the other one of the counterweights has one side as an inner coupling side, which is provided with a screw hole configured for passage of the other one of the fixing screws, and another side as an outer coupling side, which extends to an outer side of the other one of the slots and is fixedly coupled to the other one of the elastic support structures.

3. The counterweighted vibration device of claim 2, wherein each of the elastic support structures is an elastic sheet having one end fixedly coupled to the shell and the other end fixedly coupled to the outer coupling side of one of the counterweights; and the outer side of each of the slots is provided with a clearance recess configured to make space, for the elastic sheet.

4. The counterweighted vibration device of claim 2, wherein the outer coupling side of each of the counterweights has a thickness greater than or equal to twice that of the inner coupling side thereof.

5. The counterweighted vibration device of claim 4, wherein a hollow is provided in the middle of each of the counterweights, and is sized according to counterweighting parameters.

6. The counterweighted vibration device of claim 5, wherein the elastic sheet is provided centrally with an oval slot; and the end of the elastic sheet fixedly coupled to the shell is provided with two screw holes.

7. The counterweighted vibration device of claim 6, wherein lateral sides of the short strong magnetic strips and the long strong magnetic strip are provided, with opening grooves configured for passage of the fixing screws; and each of the counterweights is provided with a protrusion configured to mate with the oval slot for alignment during coupling.

8. The counterweighted vibration device of claim 7, wherein the shell is of a cuboid structure; the hollow cavity is provided with an upper opening for the coils to be installed into the hollow cavity; a side edge of the upper opening is provided with notches for passage of wires of the coils; an installation side recess for embedded installation of a printed circuit board (PCB) is provided at an outer side of the notches; and an outer side of the PCB is provided with electrical contacts to connect the wires.

9. A manufacturing method of the counterweighted vibration device of claim 8, comprising the following assembly steps: first, fixedly coupling one of the counterweights, one of the short strong magnetic strips, the long strong magnetic strip, the other one of the short strong magnetic strips and the other one of the counterweights together at two sides by using the two fixing screws, so as to form the vibration assembly; embedding coils into a hollow cavity from an upper opening of a shell; then passing the vibration assembly into the coils from the outer side of one of the slots; and then fixedly coupling each of the elastic sheets to the shell via two fixing screws with aid of the protrusion for alignment, and fixedly coupling each elastic sheet to the outer coupling side of one of the counterweights via one screw.

10. The manufacturing method of claim 9, wherein the assembly steps adopt an automatic assembly mode using an automatic conveying guide rail, with the upper opening of the shell placed upward and the steps starting from a feeding station, wherein at a first, station, which is the feeding station, the shell, is placed within a jig provided at the first station;

at a second station, the coils are put into the hollow cavity through the upper opening;

at a third station, the vibration assembly is passed by a pushing mechanism into the coils in the hollow cavity from the outer side of one of the slots;

at a fourth station, the two elastic sheets are fixedly coupled to the shell and the outer coupling sides of the counterweights, respectively, by using screw mechanisms;

at a fifth station, surface stickers and a printed circuit board (PCB) are attached; and at a sixth station, which is a discharge station, the assembled product is removed from the jig, wherein the jig is installed in a reciprocating slide rail from, the feeding station through to the discharge station; and a vertical belt conveyor guide rail or a horizontal belt conveyor guide rail is used.

* * * * *